United States Patent
Mittal et al.

(10) Patent No.: US 12,334,587 B2
(45) Date of Patent: Jun. 17, 2025

(54) SEPARATORS, LEAD ACID BATTERIES, AND METHODS AND SYSTEMS ASSOCIATED THEREWITH

(71) Applicant: Daramic, LLC, Charlotte, NC (US)

(72) Inventors: Surendra Kumar Mittal, Bangalore (IN); Mohammed Naiha, Chatenois (FR)

(73) Assignee: DARAMIC, LLC, Charlotte, NC (US)

( * ) Notice: Subject to any disclaimer, the term of this patent is extended or adjusted under 35 U.S.C. 154(b) by 99 days.

(21) Appl. No.: 16/077,580

(22) PCT Filed: Feb. 17, 2017

(86) PCT No.: PCT/US2017/018405
§ 371 (c)(1),
(2) Date: Aug. 13, 2018

(87) PCT Pub. No.: WO2017/143212
PCT Pub. Date: Aug. 24, 2017

(65) Prior Publication Data
US 2019/0058175 A1   Feb. 21, 2019

Related U.S. Application Data

(63) Continuation of application No. PCT/US2016/018217, filed on Feb. 17, 2016.

(51) Int. Cl.
*H01M 50/446*   (2021.01)
*H01M 10/06*   (2006.01)
(Continued)

(52) U.S. Cl.
CPC ......... *H01M 50/446* (2021.01); *H01M 10/06* (2013.01); *H01M 50/406* (2021.01);
(Continued)

(58) Field of Classification Search
None
See application file for complete search history.

(56) References Cited

U.S. PATENT DOCUMENTS

| | | |
|---|---|---|
| 4,086,392 A | 4/1978 | Mao et al. |
| 4,440,838 A | 4/1984 | Schmidt |
| 2003/0054232 A1* | 3/2003 | Zucker ............... H01M 2/1666 429/144 |
| 2009/0258300 A1* | 10/2009 | Moriyama ............... D01F 8/10 429/249 |

(Continued)

FOREIGN PATENT DOCUMENTS

| | | | |
|---|---|---|---|
| JP | 2011210701 A * | 10/2011 | ............ H01M 2/162 |
| WO | WO2010/058240 | 5/2010 | |

OTHER PUBLICATIONS

Kumar et al. (WO 201058240) (a raw machine translation) (Abstract) (May 27, 2010) (Year: 2010).*

(Continued)

*Primary Examiner* — Brian R Ohara
*Assistant Examiner* — M. T. Leonard
(74) *Attorney, Agent, or Firm* — J. Clinton Wimbish; Maynard Nexsen PC

(57) ABSTRACT

Disclosed herein are novel or improved separators, battery separators, lead acid battery separators, batteries, cells, and/or methods of manufacture and/or use of such separators, battery separators, lead acid battery separators, cells, and/or batteries. In accordance with at least certain embodiments, the present disclosure or invention is directed to novel or improved battery separators for lead acid batteries. In addition, disclosed herein are methods, systems and battery separators for enhancing battery life, reducing water loss, reducing float current, minimizing internal resistance increase, reducing failure rate, reducing acid stratification and/or improving uniformity in at least lead acid batteries. In accordance with at least particular embodiments, the present disclosure or invention is directed to an improved separator (Continued)

for lead acid batteries wherein the separator includes improved coatings, improved configurations, and/or the like.

10 Claims, 8 Drawing Sheets

(51) Int. Cl.
    *H01M 50/406*    (2021.01)
    *H01M 50/417*    (2021.01)
    *H01M 50/437*    (2021.01)
    *H01M 50/44*     (2021.01)
    *H01M 50/454*    (2021.01)
    *H01M 50/457*    (2021.01)
    *H01M 50/466*    (2021.01)

(52) U.S. Cl.
    CPC ....... *H01M 50/417* (2021.01); *H01M 50/437* (2021.01); *H01M 50/44* (2021.01); *H01M 50/454* (2021.01); *H01M 50/457* (2021.01); *H01M 50/466* (2021.01)

(56) References Cited

U.S. PATENT DOCUMENTS

| | | | |
|---|---|---|---|
| 2010/0129720 A1 | 5/2010 | Sako et al. | |
| 2010/0279167 A1 | 11/2010 | Watson et al. | |
| 2012/0070713 A1* | 3/2012 | Whear | C08L 89/00 429/143 |
| 2012/0070747 A1* | 3/2012 | Whear | H01M 50/463 429/247 |

OTHER PUBLICATIONS

Kumar et al. (WO 201058240) (a raw machine translation) (Detailed Description) (May 27, 2010) (Year: 2010).*
Kumar et al. (WO 201058240) (a raw machine translation) (Claims) (May 27, 2010) (Year: 2010).*
Machine translation JP2011210701A (Year: 2024).*
Search Report dated May 30, 2017; from counterpart PCT Application No. PCT/US2017/018405.
IPRP dated Aug. 21, 2018; from counterpart PCT Application No. PCT/US2017/018405.

* cited by examiner

SEPARATORS, LEAD ACID BATTERIES, AND METHODS AND SYSTEMS ASSOCIATED THEREWITH

RELATED APPLICATIONS

This application claims priority to and the benefit of International Application No. PCT/US2016/018217 filed 17 Feb. 2016.

FIELD

In accordance with at least selected embodiments, the present disclosure or invention is directed to novel or improved separators, particularly separators for lead acid batteries. In accordance with at least selected embodiments, the present disclosure or invention is directed to novel or improved separators, battery separators, batteries, cells, systems, vehicles, and/or methods of manufacture and/or use of such separators, battery separators, cells, systems, and/or batteries. In accordance with at least certain embodiments, the present disclosure or invention is directed to an improved separator for lead acid batteries and/or improved methods of using such batteries having such improved separators. In addition, disclosed herein are methods, systems, treatments, and battery separators for enhancing battery life, reducing battery failure, reducing water loss, lowering float current, minimizing internal resistance increases, increasing wettability, reducing acid stratification, improving acid diffusion, and/or improving uniformity in lead acid batteries. In accordance with at least particular embodiments, the present disclosure or invention is directed to improved separators for lead acid batteries wherein the separators include improved functional coatings.

BACKGROUND

Voltage reductions are often observed over the life span of a typical lead acid battery. As a lead acid battery is cycled, water that is present in the electrolyte can be reversibly split into hydrogen and oxygen gas, especially during periods of overcharge. However, hydrogen and oxygen gases lost from the system are not available for the reverse reaction, leading over time to reduced water levels in the battery. Such water electrolysis and reduced water levels are referred to as water loss. Water loss leads to dry-out and decline in battery capacity, grid corrosion, sulfation, or the like eventually contributing to disintegration of the battery separator and battery failure. Rates of water electrolysis are correlated with charge levels; higher float charges lead to higher rates of electrolysis, and thus higher rates of water loss. Batteries having reduced float charges will have reduced electrolysis, and correspondingly reduced rates of water loss.

Zinc has been explored as a battery additive to reduce water loss in lead acid batteries. U.S. Pat. No. 4,086,392 and WO 2010/058240 describe the addition of zinc compounds to either the grid material or electrolyte reduces the float current, thereby reducing consumption of water and water loss. Although dispersion of zinc compounds in the electrolyte reduced water loss, this method is difficult to realize in commercial settings, as it would entail an additional process step in the manufacturing operation. Besides, the efficacy of zinc compounds in the electrolyte depended largely on the functional coating of the separator. It would therefore be desirable to have this feature in the separator itself so that the need to introduce an additional manufacturing process can be obviated.

There remains a need for batteries with reduced water loss and/or float charge. There remains a need for battery components which meet the aforementioned needs. There is a need for such components that can be readily produced and easily incorporated into existing battery manufacturing operations.

SUMMARY

In accordance with at least selected embodiments, the present disclosure or invention may or can address the above issues or needs and/or provide an improved battery separator which overcomes the aforementioned problems. For instance, by enhancing battery life, reducing battery failure, reducing water loss, lowering float charge current, minimizing internal resistance increase, increasing wettability, reducing acid stratification, improving acid diffusion, and/or improving uniformity in lead acid batteries.

In accordance with at least selected embodiments, the present disclosure or invention is directed to novel or improved separators, particularly separators for lead acid batteries. In accordance with at least selected embodiments, the present disclosure or invention is directed to novel or improved separators, battery separators, batteries, cells, systems, vehicles, and/or methods of manufacture and/or use of such separators, battery separators, cells, systems, and/or batteries. In accordance with at least certain embodiments, the present disclosure or invention is directed to an improved separator for lead acid batteries and/or improved methods of using such batteries having such improved separators. In addition, disclosed herein are methods, systems, treatments, and battery separators for enhancing battery life, reducing battery failure, reducing water loss, lowering float current, minimizing internal resistance increases, increasing wettability, reducing acid stratification, improving acid diffusion, and/or improving uniformity in lead acid batteries. In accordance with at least particular embodiments, the present disclosure or invention is directed to an improved separator for lead acid batteries wherein the separator includes improved functional coatings.

In accordance with at least certain embodiments, aspects or objects, the present disclosure or invention is directed to or provides an improved separator for lead acid batteries and/or improved methods of using such batteries having such improved separators. In accordance with at least selected embodiments, the present disclosure or invention may address the above issues or needs and/or may provide novel or improved lead acid batteries. In accordance with at least selected embodiments, the present disclosure or invention is directed to novel or improved separators, battery separators, lead acid battery separators, batteries, cells, and/or methods of manufacture and/or use of such separators, battery separators, lead acid battery separators, cells, and/or batteries. In addition, disclosed herein are methods, systems and battery separators for enhancing battery life, reducing battery failure, water loss, increasing wettability, reducing acid stratification, improving acid diffusion, and/or improving uniformity in lead acid batteries. In accordance with at least particular embodiments, the present disclosure or invention is directed to an improved separator for lead acid batteries wherein the separator includes improved functional coatings.

In accordance with at least certain selected embodiments, a microporous separator enabling reduced float charge currents in lead acid batteries is provided.

In accordance with at least certain selected embodiments, a microporous separator reducing water loss in lead acid batteries is provided.

The separator may contain one or more performance enhancing additives, such as a surfactant and/or metal salt, along with other additives or agents, residual oil, and fillers. Such performance enhancing additives can reduce separator oxidation, further reduce water loss, lower float charge current, minimize internal resistance increase, and/or facilitate the transport of ions across the membrane.

BRIEF DESCRIPTION OF THE DRAWINGS

In all Figures (or FIGS.), the results of the tested batteries with various separators, including some with separators of embodiments of the present disclosure or invention, were of automotive batteries with a capacity of 75 Ah at a 20 hour rate of discharge, with a charge voltage of 14.4 V, and at a test temperature of 60° C. The batteries were tested for 84 days.

DETAILED DESCRIPTION

Figure 1:
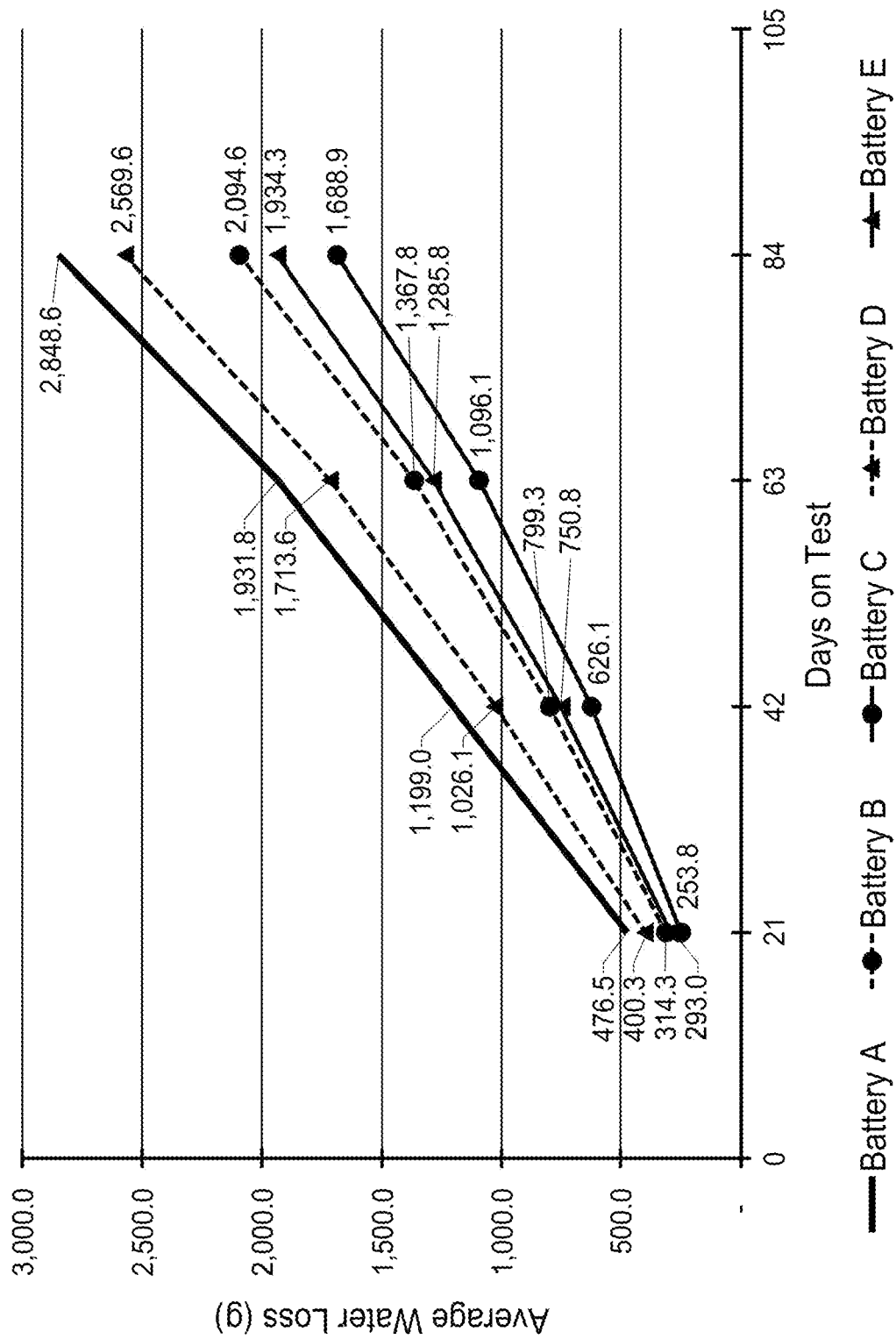
FIG. 1 is a chart showing water loss data over 84 days in 21 day intervals for test batteries containing five different separator embodiments.

In accordance with at least selected embodiments, a possibly preferred inventive separator includes a porous membrane (such as a microporous membrane having pores less than about 1 micron, mesoporous, or a macroporous membrane having pores greater than about 1 micron) made of natural or synthetic materials, such as polyolefin, polyethylene, polypropylene, phenolic resin, PVC, natural or synthetic rubber, synthetic wood pulp (SWP), glass fibers, cellulosic fibers, or combinations thereof, more preferably a microporous membrane made from thermoplastic polymers. The preferred microporous membranes may have pore diameters of about 0.1 micron (100 nanometers) and porosities of about 60%. The thermoplastic polymers may, in principle, include all acid-resistant thermoplastic materials suitable for use in lead acid batteries. The preferred thermoplastic polymers include polyvinyls and polyolefins. The polyvinyls include, for example, polyvinyl chloride (PVC). The polyolefins include, for example, polyethylene, such as ultrahigh molecular weight polyethylene (UHMWPE), and polypropylene. One preferred membrane embodiment may include a mixture of filler (for example, silica) and UHMWPE (and optionally residual oil).

The porous membrane layer can include a polyolefin, such as polypropylene, ethylene-butene copolymer, and preferably polyethylene, more preferably high molecular weight polyethylene, i.e. polyethylene having a molecular weight of at least 600,000, even more preferably ultra-high molecular weight polyethylene (UHMWPE), i.e. polyethylene having a molecular weight of at least 1,000,000, in particular more than 4,000,000, and most preferably 5,000,000 to 8,000,000 (measured by viscosimetry and calculated by Margolie's equation), a standard load melt index of substantially 0 (measured as specified in ASTM D 1238 (Condition E) using a standard load of 2,160 g) and a viscosity number of not less than 600 ml/g, preferably not less than 1,000 ml/g, more preferably not less than 2,000 ml/g, and most preferably not less than 3,000 ml/g (determined in a solution of 0.02 g of polyolefin in 100 g of decalin at 130° C.).

In accordance with at least one embodiment, the porous membrane can include an ultrahigh molecular weight polyethylene (UEMWPE) mixed with a processing oil and silica. In accordance with at least one embodiment, the microporous membrane can include an ultrahigh molecular weight polyethylene (UEMWPE) mixed with a processing oil, additive and silica. The mixture may also include minor amounts of other additives or agents as is common in the separator arts (such as wetting agents, colorants, antistatic additives, and/or the like). The microporous polymer layer can be a homogeneous mixture of 8 to 100% by volume of polyolefin, 0 to 40% by volume of a plasticizer and 0 to 92% by volume of inert filler material. The filler can be dry, finely divided silica. The preferred plasticizer is petroleum oil. Since the plasticizer is the component which is easiest to remove from the polymer-filler-plasticizer composition, it is useful in imparting porosity to the battery separator. In some embodiments, the porous membrane may be made by mixing, in an extruder, about 30% by weight silica with about 10% by weight UHMWPE, and about 60% by weight processing oil.

The microporous membrane can be made by passing the ingredients through a heated extruder, passing the extrudate generated by the extruder through a die and into the nip formed by two heated calender rolls to form a continuous web, extracting a substantial amount of the processing oil from the web by use of a solvent, drying the extracted web, slitting the web into lanes of predetermined width, and winding the lanes into rolls. The calender rolls may be engraved with various groove patterns to impart ribs, serrations, embossments and the like to the membrane. Alternatively, or additionally, ribs and the like may be imparted to the porous membrane by passing the extruded membrane through additional appropriately grooved calender rolls or presses.

The microporous polymer layer can have an average pore size of less than 1 μm in diameter. Preferably more than 50% of the pores are 0.5 μm or less in diameter. It is especially preferred that at least 90% of the pores have a diameter of less than 0.5 μm. The microporous polymer layer preferably has an average pore size within the range of 0.05 to 0.5 μm, preferably 0.1 to 0.2 μm.

In some embodiments, the additive includes a surfactant. Suitable surfactants include surfactants such as salts of alkyl sulfates; alkylarylsulfonate salts; alkylphenol-alkylene oxide addition products; soaps; alkyl-naphthalene-sulfonate salts; dialkyl esters of sulfo-succinate salts; quaternary amines; block copolymers of ethylene oxide and propylene oxide; and salts of mono and dialkyl phosphate esters. The additive can be a non-ionic surfactant such as polyol fatty acid esters, polyethoxylated esters, polyethoxylated alcohols, alkyl polysaccharides such as alkyl polyglycosides and blends thereof, amine ethoxylates, sorbitan fatty acid ester ethoxylates, organosilicone based surfactants, ethylene vinyl acetate terpolymers, ethoxylated alkyl aryl phosphate esters and sucrose esters of fatty acids.

In certain embodiments, the additive can be represented by a compound of Formula (I)

$$R(OR^1)_n(COOM_{1/x}{}^{x+})_m \quad (I)$$

in which:
R is a non-aromatic hydrocarbon radical with 10 to 4200 carbon atoms, preferably 13 to 4200, which can be interrupted by oxygen atoms;
$R^1$=H, —$(CH_2)_k$COOM$^{x+}{}_{1/x}$ or —$(CH_2)_k$—SO$_3$M$^{x+}{}_{1/x}$, preferably H, where k=1 or 2;
M is an alkali metal or alkaline-earth metal ion, H$^+$ or NH$_4{}^+$, where not all the variables M simultaneously have the meaning H$^+$;
n=0 or 1;
m=0 or an integer from 10 to 1400; and
x=1 or 2.

The ratio of oxygen atoms to carbon atoms in the compound according to Formula (I) being in the range from 1:1.5 to 1:30 and m and n not being able to simultaneously be 0. However, preferably only one of the variables n and m is different from 0.

By non-aromatic hydrocarbon radicals is meant radicals which contain no aromatic groups or which themselves represent one. The hydrocarbon radicals can be interrupted by oxygen atoms, i.e. contain one or more ether groups.

R is preferably a straight-chain or branched aliphatic hydrocarbon radical which can be interrupted by oxygen atoms. Saturated, uncross-linked hydrocarbon radicals are quite particularly preferred.

Surprisingly, it was found that through the use of the compounds of Formula (I) for the production of battery separators, they can be effectively protected against oxidative destruction.

Battery separators are preferred which contain a compound according to Formula (I) in which:
R is a hydrocarbon radical with 10 to 180, preferably 12 to 75 and quite particularly preferably 14 to 40 carbon atoms, which can be interrupted by 1 to 60, preferably 1 to 20 and quite particularly preferably 1 to 8 oxygen atoms, particularly preferably a hydrocarbon radical of formula $R^2$—[$(OC_2H_4)_p(OC_3H_6)_q$]—, in which:
$R^2$ is an alkyl radical with 10 to 30 carbon atoms, preferably 12 to 25, particularly preferably 14 to 20 carbon atoms;
P is an integer from 0 to 30, preferably 0 to 10, particularly preferably 0 to 4; and
q is an integer from 0 to 30, preferably 0 to 10, particularly preferably 0 to 4;
compounds being particularly preferred in which the sum of p and q is 0 to 10, in particular 0 to 4;
n=1; and
m=0.

Formula $R^2$—[$(OC_2H_4)_p(OC_3H_6)_q$]— is to be understood as also including those compounds in which the sequence of the groups in square brackets differs from that shown. For example according to the invention compounds are suitable in which the radical in brackets is formed by alternating $(OC_2H_4)$ and $(OC_3H_6)$ groups.

Additives in which $R^2$ is a straight-chain or branched alkyl radical with 10 to 20, preferably 14 to 18 carbon atoms have proved to be particularly advantageous. $OC_2H_4$ preferably stands for $OCH_2CH_2$, $OC_3H_6$ for $OCH(CH_3)_2$ and/or $OCH_2CH_2CH_3$.

As preferred additives there may be mentioned in particular alcohols (p=q=0; m=0) primary alcohols being particularly preferred, fatty alcohol ethoxylates (p=1 to 4, q=0), fatty alcohol propoxylates (p=0; q=1 to 4) and fatty alcohol alkoxylates (p=1 to 2; q=1 to 4) ethoxylates of primary alcohols being preferred. The fatty alcohol alkoxylates are for example accessible through reaction of the corresponding alcohols with ethylene oxide or propylene oxide.

Additives of the type m=0 which are not, or only difficulty, soluble in water and sulphuric acid have proved to be particularly advantageous.

Also preferred are additives which contain a compound according to Formula (I), in which:
R is an alkane radical with 20 to 4200, preferably 50 to 750 and quite particularly preferably 80 to 225 carbon atoms;
M is an alkali metal or alkaline-earth metal ion, H$^+$ or NH$_4{}^+$, in particular an alkali metal ion such as Li$^+$, Na$^+$ and K$^+$ or H$^+$, where not all the variables M simultaneously have the meaning H$^+$;
n=0;
m is an integer from 10 to 1400; and
x=1 or 2.

As suitable additives there may be mentioned here in particular polyacrylic acids, polymethacrylic acids and acrylic acid-methacrylic acid copolymers, whose acid groups are at least partly, i.e. preferably 40%, particularly preferably 80%, neutralized. The percentage refers to the number of acid groups. Quite particularly preferred are poly(meth)acrylic acids which are present entirely in the salt form. By poly(meth)acrylic acids are meant polyacrylic acids, polymethacrylic acids and acrylic acid-methacrylic acid copolymers. Poly(meth)acrylic acids are preferred and in particular polyacrylic acids with an average molar mass $M_w$ of 1,000 to 100,000 g/mol, particularly preferably 1,000 to 15,000 g/mol and quite particularly preferably 1,000 to 4,000 g/mol. The molecular weight of the poly(meth)acrylic acid polymers and copolymers is ascertained by measuring the viscosity of a 1% aqueous solution, neutralized with sodium hydroxide solution, of the polymer (Fikentscher's constant).

Also suitable are copolymers of (meth)acrylic acid, in particular copolymers which, besides (meth)acrylic acid contain ethylene, maleic acid, methyl acrylate, ethyl acrylate, butyl acrylate and/or ethylhexyl acrylate as comonomer. Copolymers are preferred which contain at least 40% by weight, preferably at least 80% by weight (meth)acrylic acid monomer, the percentages being based on the acid form of the monomers or polymers.

To neutralize the polyacrylic acid polymers and copolymers, alkali metal and alkaline-earth metal hydroxides such as potassium hydroxide and in particular sodium hydroxide are particularly suitable.

The porous membrane can be provided in various ways with the additive, agents, fillers, or additives. For example, the additive be applied to the porous membrane when it is finished (i.e. after the extraction) and/or added to the mixture or the components used to produce the membrane. According to a preferred embodiment the additive or a solution of the additive is applied to the surface of the porous membrane. This variant is suitable in particular for the application of non-thermostable additives and additives which are soluble in the solvent used for the subsequent extraction. Particularly suitable as solvents for the additives according to the invention are low-molecular-weight alcohols, such as methanol and ethanol, as well as mixtures of these alcohols with water. The application can take place on the side facing the negative electrode, the side facing the positive electrode or on both sides of the microporous membrane.

The application may also take place by dipping the microporous membrane in the additive or a solution of the additive and subsequently optionally removing the solvent, e.g. by drying. In this way the application of the additive can be combined for example with the extraction often applied during separator production.

Another preferred option is to mix the additive or additives into the mixture of thermoplastic polymer and optionally fillers and other additives which is used to produce the porous membrane. The additive-containing homogeneous mixture is then formed into a web-shaped material.

The additive can be present at a density of at least about 0.5 g/m$^2$, 1.0 g/m$^2$, 1.5 g/m$^2$, 2.0 g/m$^2$, 2.5 g/m$^2$, 3.0 g/m$^2$, 3.5 g/m$^2$, 4.0 g/m$^2$, 4.5 g/m$^2$, 5.0 g/m$^2$, 5.5 g/m$^2$, 6.0 g/m$^2$, 6.5 g/m$^2$, 7.0 g/m$^2$, 7.5 g/m$^2$, 8.0 g/m$^2$, 8.5 g/m$^2$, 9.0 g/m$^2$, 9.5 g/m$^2$ or 10.0 g/m$^2$. The additive can be present on the separator at a density between about 0.5-10 g/m$^2$, 1.0-10.0 g/m$^2$, 1.5-10.0 g/m$^2$, 2.0-10.0 g/m$^2$, 2.5-10.0 g/m$^2$, 3.0-10.0 g/m$^2$, 3.5-10.0 g/m$^2$, 4.0-10.0 g/m$^2$, 4.5-10.0 g/m$^2$, 5.0-10.0 g/m$^2$, 5.5-10.0 g/m$^2$, 6.0-10.0 g/m$^2$, 6.5-10.0 g/m$^2$, 7.0-10.0 g/m$^2$, 7.5-10.0 g/m$^2$, 5.0-10.5 g/m$^2$, 5.0-11.0 g/m$^2$, 5.0-12.0 g/m$^2$, or 5.0-15.0 g/m$^2$. The additive can be present on the microporous membrane at a density of about 6.0-10.0 g/m$^2$, 6.5-9.5 g/m$^2$, 6.5-9.0 g/m$^2$, 6.5-8.5 g/m$^2$, 6.5-8.0 g/m$^2$, or 7.0-8.0 g/m$^2$. In some embodiments, the additive is present at a density of about 7.5 g/m$^2$. In some embodiments, the additive can be present on the microporous membrane at a density of about 2.0-8.0 g/m$^2$, 2.5-7.5 g/m$^2$, 3.0-7.0 g/m$^2$, 3.5-6.5 g/m$^2$, 4.0-6.0 g/m$^2$, or 4.5-5.5 g/m$^2$. In some embodiments, the additive is present at a density of about 5.0 g/m$^2$.

In certain selected embodiments, the porous membrane can contain a metal salt. Exemplary metal salts include zinc and bismuth compounds, including mixtures thereof. Suitable counter ions include sulfate, hydroxide, phosphate, tetrafluoroborate and fluoride.

In some embodiments, the metal salt can be a sulfate salt such as $ZnSO_4$ or $Bi_2(SO_4)_3$. Unless specified otherwise, the term "$ZnSO_4$" includes the anhydrous salt as well as hydrates/solvates thereof, such as $ZnSO_4.H_2O$.

The metal salt can be applied to the porous membrane when it is finished (i.e. after the extraction) and/or added to the mixture used to produce the membrane. According to a preferred embodiment a solution of the metal salt is applied to the surface of the porous membrane. Particularly suitable as solvents for the metal salt are water or dilute sulfuric acid. The application can take place on the side facing the negative electrode, the side facing the positive electrode or on both sides of the microporous membrane.

The application may also take place by dipping the microporous membrane in a solution of the metal salt and subsequently optionally removing the solvent, e.g. by drying. In this way the application of the metal salt can be combined for example with the extraction often applied during separator production.

Another preferred option is to mix the metal salt into the mixture of thermoplastic polymer and optionally fillers and other additives which is used to produce the porous membrane. The metal salt-containing homogeneous mixture is then formed into a web-shaped material.

The metal salt can be provided to the porous membrane in the same layer as the aforementioned additive. In such embodiments, the metal salt and additive may be combined into a single solution and applied using one or more of the described above. Generally, such combined applications results in a homogeneous coating of additive and metal salt on the porous membrane. In other embodiments, the metal salt can be applied as separate layer from the additive. The additive can be applied to the porous membrane either before or after the metal salt is applied to the porous membrane. Such embodiments can be referred to as layered coatings. It is to be understood that layered coating are not necessarily completely separate from each other. That is, there can be some amount of penetration of the additive coating layer into the metal salt coating layer, and vice versa. In certain selected embodiments, the inventive separator can include a porous membrane with an additive layer and a metal salt layer, wherein the additive layer is between the porous membrane and the metal salt layer.

As demonstrated in FIGS. 1-5, batteries prepared with separators having both an additive and metal salt coating exhibit reduced water loss, reduced internal resistance, and reduced float current relative to batteries with separators lacking the metal salt. Also, separators having a separate layer of additive and metal salt can have reduced water loss, reduced internal resistance, and reduced float current relative to separators having a single combined coating of the additive and salt.

The metal salt can be present at a density of at least about 0.5 g/m$^2$, 1.0 g/m$^2$, 1.5 g/m$^2$, 2.0 g/m$^2$, 2.5 g/m$^2$, 3.0 g/m$^2$, 3.5 g/m$^2$, 4.0 g/m$^2$, 4.5 g/m$^2$, 5.0 g/m$^2$, 5.5 g/m$^2$, 6.0 g/m$^2$, 6.5 g/m$^2$, 7.0 g/m$^2$, 7.5 g/m$^2$, 8.0 g/m$^2$, 8.5 g/m$^2$, 9.0 g/m$^2$, 9.5 g/m$^2$ or 10.0 g/m$^2$. The metal salt can be present on the separator at a density between about 0.5-10 g/m$^2$, 0.5-8.0 g/m$^2$, 0.5-7.0 g/m$^2$, 1.0-7.0 g/m$^2$, 1.0-6.0 g/m$^2$, 2.0-6.0 g/m$^2$, 2-5 g/m$^2$, 2-4.0 g/m$^2$, 2.5-4.0 g/m$^2$, or 2.5-3.5.0 g/m$^2$. In some embodiments, the metal salt is present at a density of about 3.0 g/m$^2$.

In certain selected embodiments, the filler may further contain one or more zeolite or PIMS material. A zeolite can be added to the mixture as one of the filler materials, thereby providing zeolites entangled within the composite mat. The zeolite reduces metal and metalloid movement through the composite, thereby reducing metal induced oxidation, antimony poisoning and the like. In certain selected embodiments, the separator may contain a pyrophosphate such as found in PIMS material. A PIMS mineral derived from fish bone (such as commercial, lab ground fish meal) has been shown to have high affinity for metal ions. In accordance with at least certain embodiments. it is preferred that the fish bone powder be added to substitute for a portion of the silica at substitution levels of about 1% to 20% by weight of the silica, more preferably about 2% to 10% by weight, and most preferably at about 2% to 5% by weight. In accordance with at least other certain embodiments, it is preferred that the ground fish bone powder (ground fish meal) be added to substitute for a portion of the silica at substitution levels of about 1% to 50% by weight or more of the silica, more preferably about 5% to 30% by weight, and most preferably at about 10% to 20% by weight.

In some selected embodiments, the porous separator can have ribs. The porous membrane can have transverse cross-ribs on the opposite face of the membrane as the longitudinal ribs. The cross-rib can be parallel to the longitudinal ribs, or can be disposed at an angle thereto. For instance, the cross ribs can be oriented about 90°, 80°, 75°, 60°, 50°, 45°, 35°, 25°, 15° or 5° relative to the longitudinal ribs. The cross-ribs can be oriented about 90-60°, 60-30°, 60-45°, 45-30°, or 30-0° relative to the longitudinal ribs. Typically the cross ribs are on the face of the membrane facing the negative electrode. In some embodiments of the present invention, the ribbed membrane can have a transverse cross-rib height of at least about 0.005 mm, 0.01 mm, 0.025 mm, 0.05 mm, 0.075 mm, 0.1 mm, 0.2 mm, 0.3 mm, 0.4 mm, 0.5 mm, 0.6 mm, 0.7 mm, 0.8 mm, 0.9 mm, or 1.0 mm. In some embodiments of the present invention, the ribbed membrane can have a transverse cross-rib height of no greater than about 1.0 mm, 0.5 mm, 0.25 mm, 0.20 mm, 0.15 mm, 0.10 mm or 0.05 mm.

In some embodiments of the present invention, the ribbed membrane can have a transverse cross-rib width of at least about 0.005 mm, 0.01 mm, 0.025 mm, 0.05 mm, 0.075 mm, 0.1 mm, 0.2 mm, 0.3 mm, 0.4 mm, 0.5 mm, 0.6 mm, 0.7 mm, 0.8 mm, 0.9 mm, or 1.0 mm. In some embodiments of the present invention, the ribbed membrane can have a transverse cross-rib width of no greater than about 1.0 mm, 0.5 mm, 0.25 mm, 0.20 mm, 0.15 mm, 0.10 mm or 0.05 mm.

In some embodiments of the present invention, the ribbed membrane can have longitudinal rib height of at least about 0.005 mm, 0.01 mm, 0.025 mm, 0.05 mm, 0.075 mm, 0.1 mm, 0.2 mm, 0.3 mm, 0.4 mm, 0.5 mm, 0.6 mm, 0.7 mm, 0.8 mm, 0.9 mm, 1.0 mm, 1.1 mm, 1.2 mm, 1.3 mm, 1.4 mm, or 1.5 mm.

In some embodiments of the present invention, the ribbed membrane can have longitudinal rib width of at least about 0.005 mm, 0.01 mm, 0.025 mm, 0.05 mm, 0.075 mm, 0.1 mm, 0.2 mm, 0.3 mm, 0.4 mm, 0.5 mm, 0.6 mm, 0.7 mm, 0.8 mm, 0.9 mm, 1.0 mm, 1.1 mm, 1.2 mm, 1.3 mm, 1.4 mm, or 1.5 mm. The ribbed membrane can have a longitudinal rib width between about 0.005-1.5 mm, 0.01-1.0 mm, 0.025-1.0 mm, 0.05-1.0 mm, 0.075-1.0 mm, 0.1-1.0 mm, 0.2-1.0 mm, 0.3-1.0 mm, 0.4-1.0 mm. 0.5-1.0 mm, 0.4-0.8 mm or 0.4-0.6 mm.

In certain selected embodiments the porous membrane can have a transverse cross-rib height of about 0.10-0.15 mm, and a longitudinal rib height of about 0.1-0.15 mm. In some embodiments, the porous membrane can have a transverse cross-rib height of about 0.10-0.125 mm, and a longitudinal rib height of about 0.1-0.125 mm.

The microporous membrane can have a backweb thickness that is at least 0.1 mm, 0.2 mm, 0.3 mm, 0.4 mm, 0.5 mm 0.6 mm, 0.7 mm, 0.8 mm, 0.9 mm or 1.0 mm. The ribbed separator can have a backweb thickness that is no more than about 1.0 mm, 0.9 mm, 0.8 mm, 0.7 mm, 0.6 mm, 0.5 mm, 0.4 mm, 0.3 mm, 0.2 mm or 0.1 mm. In some embodiments, the microporous membrane can have a backweb thickness between about 0.1-1.0 mm, 0.1-0.8 mm, 0.1-0.5 mm, 0.1-0.5 mm, 0.1-0.4 mm, 0.1-0.3 mm. In some embodiments, the microporous membrane can have a backweb thickness of about 0.2 mm.

The fibrous layers can be present on the microporous membrane at a thickness of at least about 0.1 mm, 0.2 mm, 0.3 mm, 0.4 mm, 0.5 mm, 0.6 mm, 0.7 mm, 0.8 mm, 0.9 mm, 1.0 mm, 1.1 mm, 1.2 mm, 1.3 mm, 1.4 mm or 1.5 mm. In some embodiments, the fibrous layers can be present on the microporous membrane at a thickness from about 0.1-1.5 mm, 0.5-1.5 mm, 0.75-1.5 mm, 0.75-1.25 mm or 1.0-1.25 mm.

Figure 6:
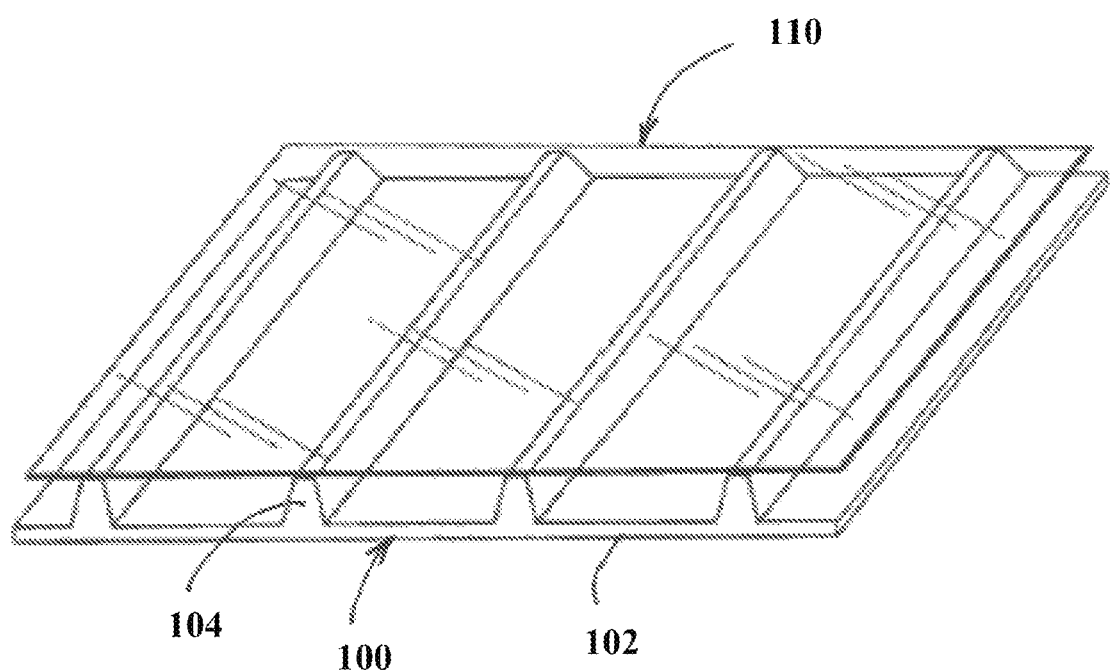
FIG. 6 is a schematic representation of at least a portion of a separator and a glass mat on one side thereof.

FIG. 6 is a schematic representation of at least a portion of a separator 100 and a glass mat 110 on one side thereof. The separator 100 may be a porous membrane having a backweb 102 and ribs 104 on one or both sides thereof. Such a separator 100 may be used in a flooded lead acid battery and may be used with or without glass mat 110 or may have a glass mat 110 on both sides thereof.

The separators of the present invention can be provided either in sheet form or in the form of an envelope. In some embodiments, a microporous membrane, which may be covered on at least one side with at least one fibrous layer, is provided as a pocket or envelope. When the fibrous layer is present, it is preferred that the microporous membrane has a larger surface area than the fibrous layers. Thus, when combining the microporous membrane and the fibrous layers, the fibrous layers do not completely cover the microporous layer. It is preferred that at least two opposing edge regions of the membrane layer remain uncovered to provide edges for heat sealing which facilitates the formation of pockets or envelope. The separators can be processed to form hybrid envelopes. The hybrid envelope can be formed by forming one or more slits or openings (such as or near the base or fold of the envelope) before, during or after, folding the separator sheet in half and bonding edges of the separator sheet together so as to form an envelope. The sides are bonded together using welds or mechanical seals to form seams that bring one side of the separator sheet into contact with another side of the separator sheet. Welds can be accomplished, for instance, using heat or ultrasonic processes. This process results in an envelope shape having a bottom folded edge and two lateral edges.

Separators disclosed herein in the form of an envelope may have one or more slits or openings along the folded or sealed creases of the envelope. The length of the openings can be at least 1/50th, 1/25th, 1/20th, 1/15th., 1/10th, 1/8th, 1/5th, 1/4th, or 1/3rd the length of the entire edge. The length of the openings can be 1/50th to 1/3rd, 1/25th to 1/3rd, 1/20th to 1/3rd, 1/20th to 1/4th, 1/15th to 1/4th, 1/15th to 1/5th or 1/10th to 1/5th the length of the entire edge. The hybrid envelope can have 1-5, 1-4, 2-4, 2-3 or 2 openings, which may or may not be equally disposed along the length of the bottom edge. It is preferred that no opening is in the corner of the envelope. The slits may be cut after the separator has been folded and sealed to give an envelope, or the slits may be formed prior to shaping the porous membrane into the envelop.

The separators provided herein permit the production of batteries with reduced water loss and/or reduced float currents compared to batteries made from or with conventional separators. In some embodiments, water loss can be reduced by more than 10%, 20%, 30%, 40%, 50%, 60%, 70% or 80%. In some embodiments, float current can be reduced by more than 10%, 20%, 30%, 40%, 50%, 60%, 70% or 80%. Batteries prepared using the disclosed separators exhibit reduced internal resistance increase over time, and in some cases exhibit no increased internal resistance.

EXAMPLES

The following examples involve five separate sets of batteries with the attributes described in Table 1, below. All batteries tested were automotive batteries with a capacity of 75 Ah at 20° C., with a charge voltage of 14.4 V, and at a test temperature of 60° C. The batteries were tested for 84 days.

TABLE 1

Test Batteries.

| | |
|---|---|
| Battery A | Batteries with conventional polyethylene (PE) separators |
| Battery B | Batteries with conventional PE separators having a first commercially available surfactant coating at 5 g/m$^2$ |
| Battery C | Batteries with conventional PE separators having a two-step coating of the first commercially available surfactant coating at 5 g/m$^2$, then an additional coating of ZnSO$_4$ at 3 g/m$^2$. |
| Battery D | Batteries with conventional PE separators having a second commercially available surfactant coating at 5 g/m$^2$. The second commercially available surfactant being different than the first surfactant, and not indicating a second coating. |
| Battery E | Batteries with conventional PE separators having a one-step coating of the first commercially available surfactant coating at 5 g/m$^2$ and a ZnSO$_4$ coating at 3 g/m$^2$ applied at the same time. |

In FIGS. 1-3D: Battery A is denoted by a solid thick line; Battery B is denoted by a dashed line with circular data points; Battery C is denoted by a solid line with circular data points; Battery D is denoted by a dashed line with triangular data points; and Battery E is denoted by a solid line with triangular data points.

Referring now to FIG. 1, the cumulative water loss data (in grams) is presented in chart form over the duration of the 84 day test. The data was collected at 21 day intervals (21 days on test, 42 days on test, 63 days on test, and 84 days on test). As can be seen, Battery C exhibits the least amount of water loss over the duration of the test. Table 2, below, shows the cumulative water loss data taken every 21 days over the duration of the test. This is the same data presented in FIG. 1. As can be seen, the order of batteries having the least amount of water loss to the most water loss is as follows: Battery C; Battery E; Battery B; Battery D; Battery A. Showing that the surfactant additives used in conjunction with a $ZnSO_4$ additive performed the best in terms of water loss.

TABLE 2

Water Loss Data (g)
Water Loss (g)

| Days | Battery A | Battery B | Battery C | Battery D | Battery E |
|---|---|---|---|---|---|
| 21 | 476.5 | 314.3 | 253.8 | 400.3 | 293. |
| 42 | 1,199.0 | 799.3 | 626.1 | 1,026.1 | 7,50.8 |
| 63 | 1,931.8 | 1,367.8 | 1,096.1 | 1,713.6 | 1,285.8 |
| 84 | 2,848.6 | 2,094.6 | 1,688.9 | 2,569.6 | 1,934.3 |

Figure 2:
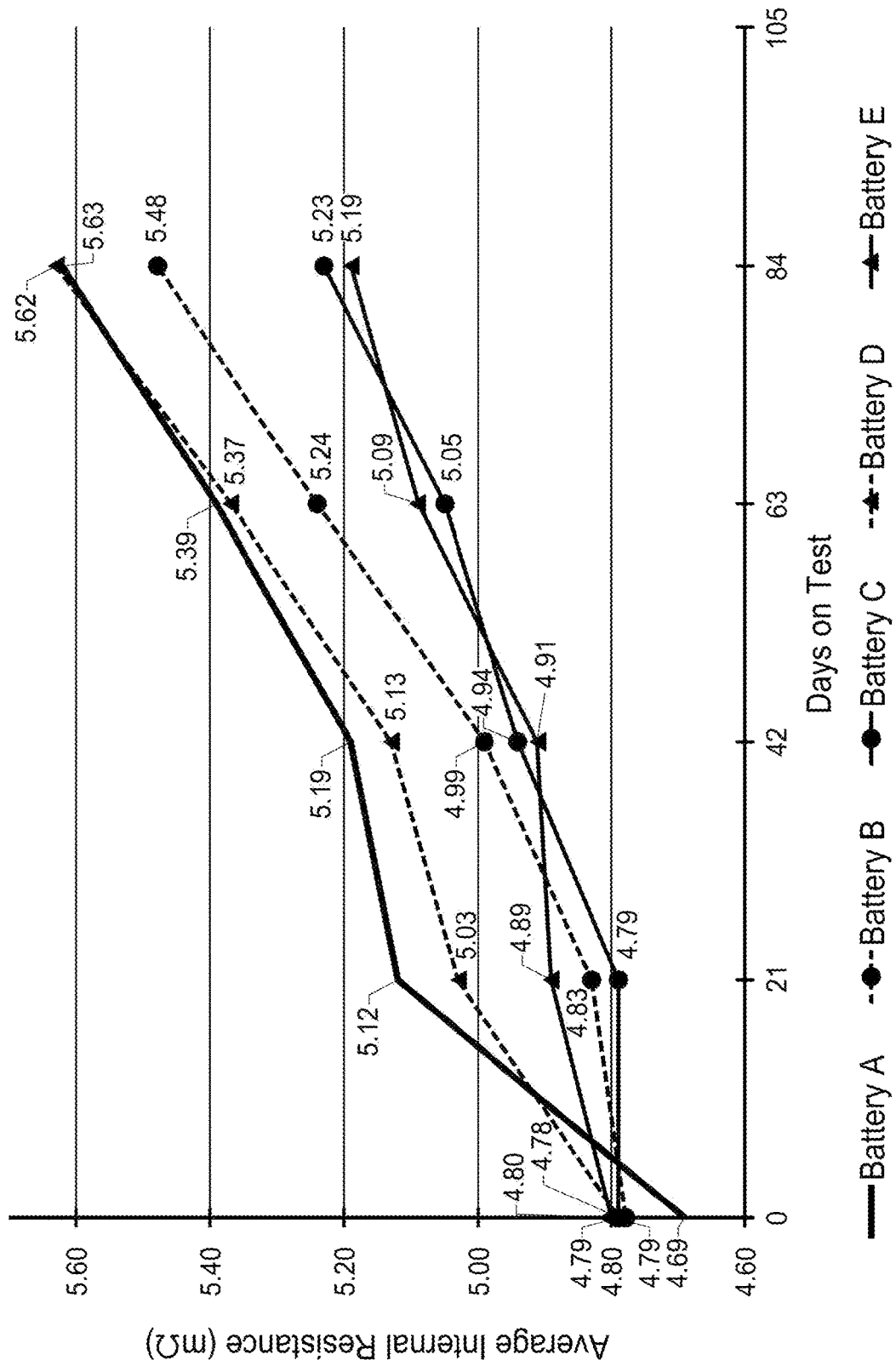
FIG. 2 is a chart showing internal resistance data over 84 days in 21 day internals for test batteries containing five different separator embodiments.

Referring now to FIG. 2, the internal resistance data (in mΩ) is presented in chart form over the duration of the 84 day test. The data was collected at 21 day intervals (21 days on test, 42 days on test, 63 days on test, and 84 days on test). Table 3, below, shows the internal resistance data taken every 21 days over the duration of the test. This is the same data presented in FIG. 2. Battery A started the test with the lowest internal resistance, but as can be seen, Battery C and Battery E exhibited the lowest internal resistance over the duration of the test. Showing again that the surfactant additives used in conjunction with a $ZnSO_4$ additive performed the best.

TABLE 3

Internal Resistance Data (mΩ)
Water Loss (g)

| Days | Battery A | Battery B | Battery C | Battery D | Battery E |
|---|---|---|---|---|---|
| 0 (start) | 4.69 | 4.78 | 4.79 | 4.79 | 4.80 |
| 21 | 5.12 | 4.83 | 4.79 | 5.03 | 4.89 |
| 42 | 5.19 | 4.99 | 4.94 | 5.13 | 4.91 |
| 63 | 5.39 | 5.24 | 5.05 | 5.37 | 5.09 |
| 84 | 5.62 | 5.48 | 5.23 | 5.63 | 5.19 |

Figure 3A:
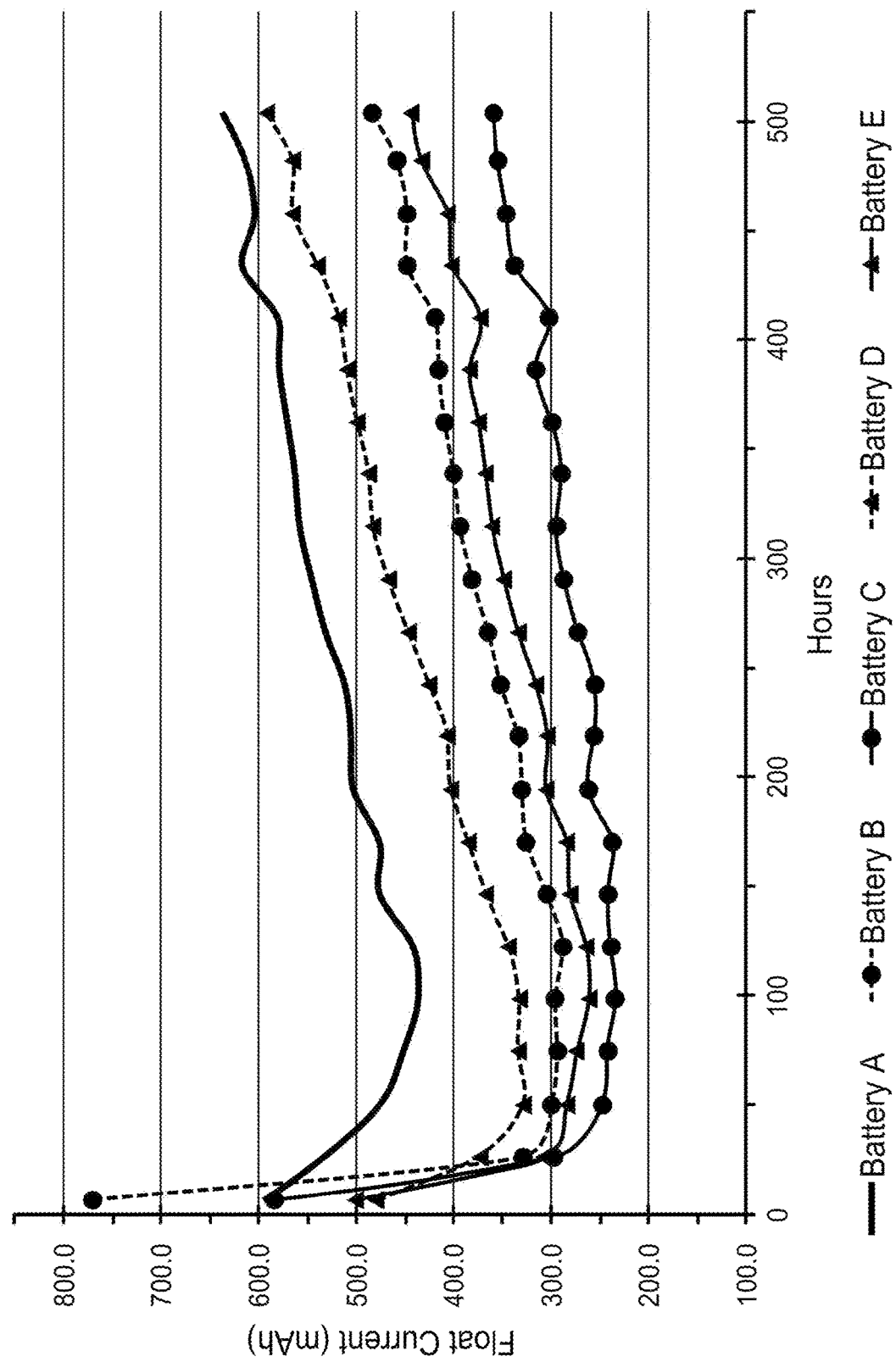
FIGS. 3A-3D are charts showing float current data over 84 days in 21 day intervals for test batteries containing five different separator embodiments.
Figure 3B:
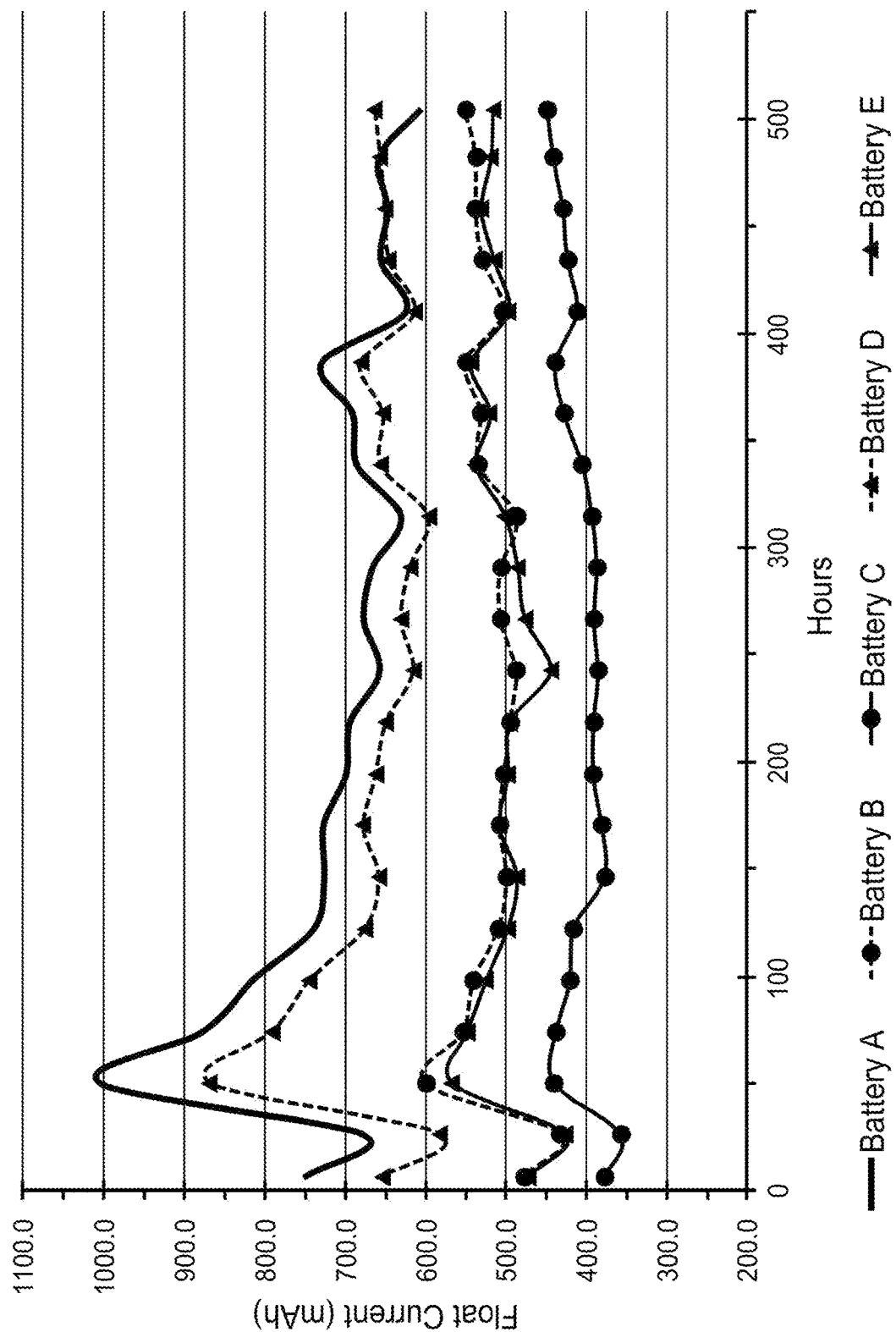
Figure 3C:
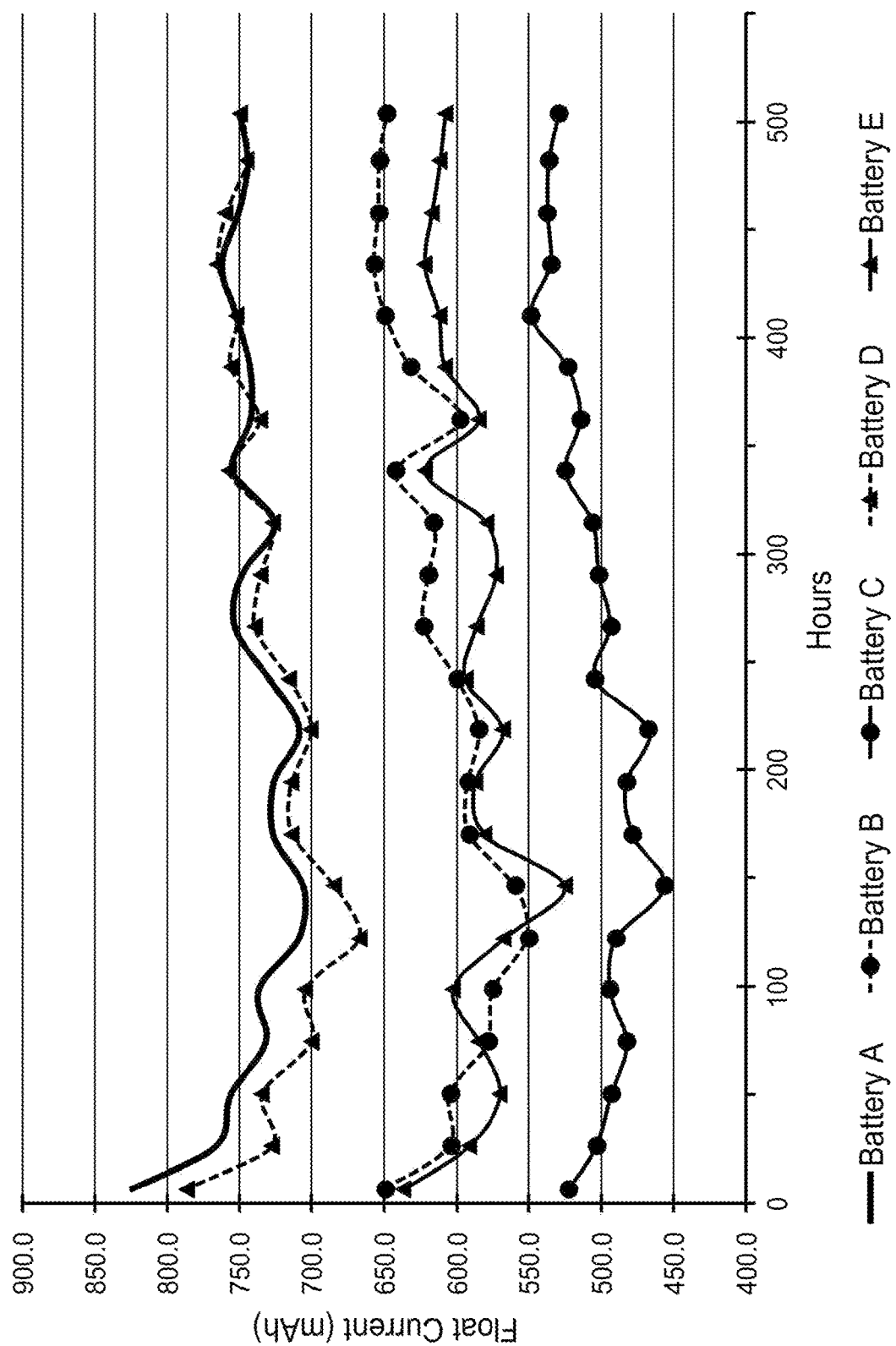
Figure 3D:
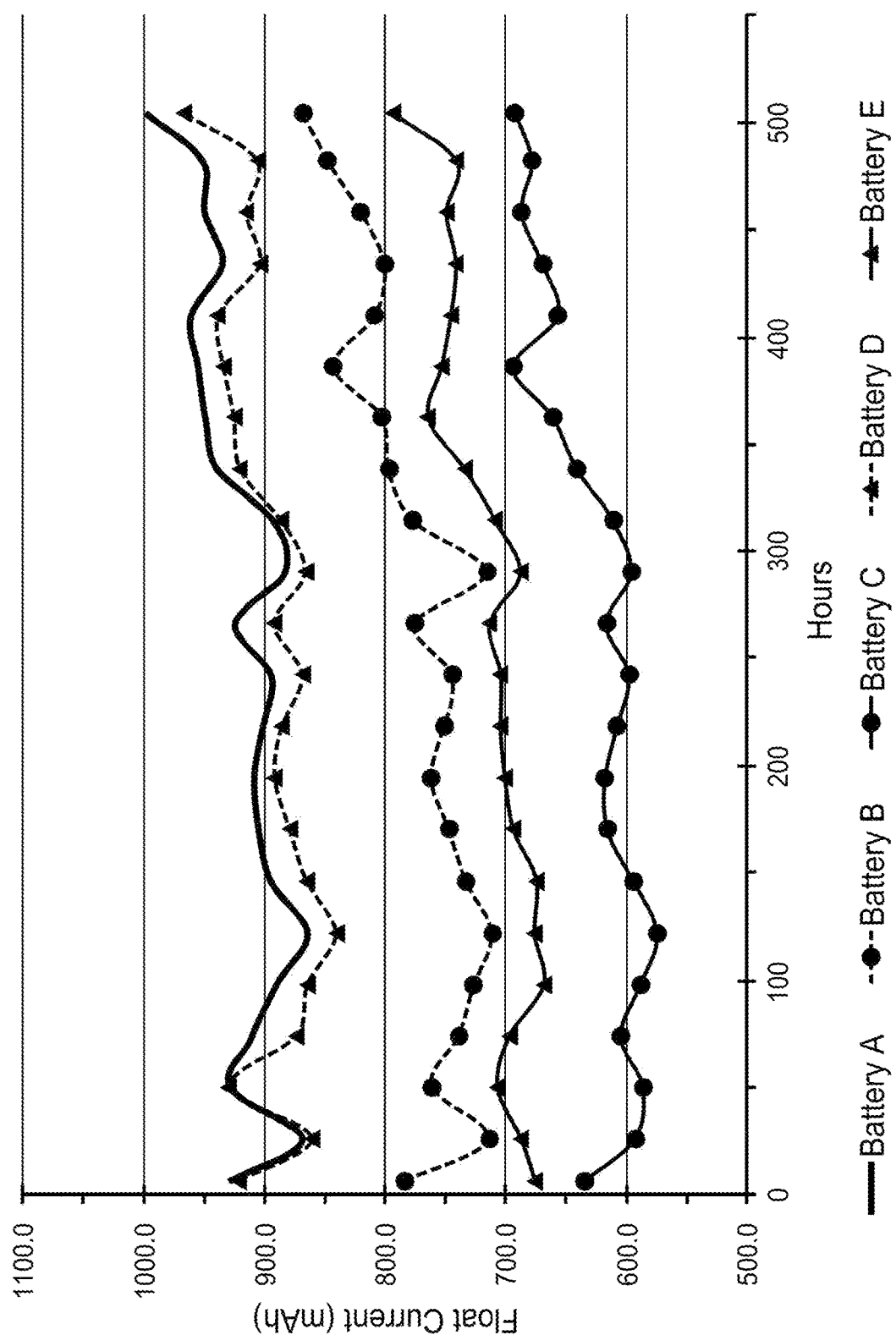

Referring now to FIGS. 3A-3D, charts showing float current data over 84 days for the five test batteries with various separator embodiments are presented. Float current results for the batteries are shown taken at 21 day intervals from day 21 to day 84. FIG. 3A shows the data at day 21, FIG. 3B shows the data at day 42, FIG. 3C shows the data at day 63, and FIG. 3D shows the data at day 84. When comparing the data, it can be seen that the batteries utilizing separators with $ZnSO_4$ out-performed the other batteries. Further, Battery C, the batteries utilizing a two-step coating of a surfactant and $ZnSO_4$, yielded the lowest float charge current over the 84 day test.

Figure 4:
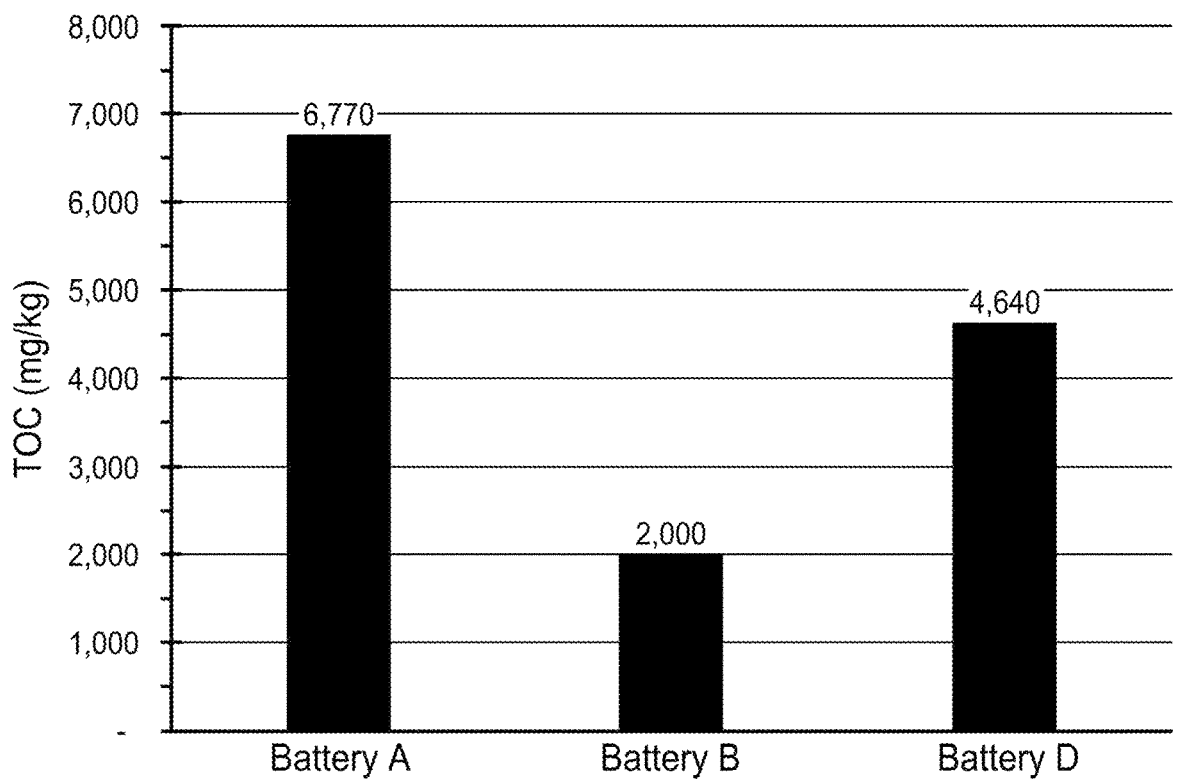
FIG. 4 is a chart showing the total organic compounds (TOC) in three of the test battery samples at the end of 84 days on test.
Figure 5:
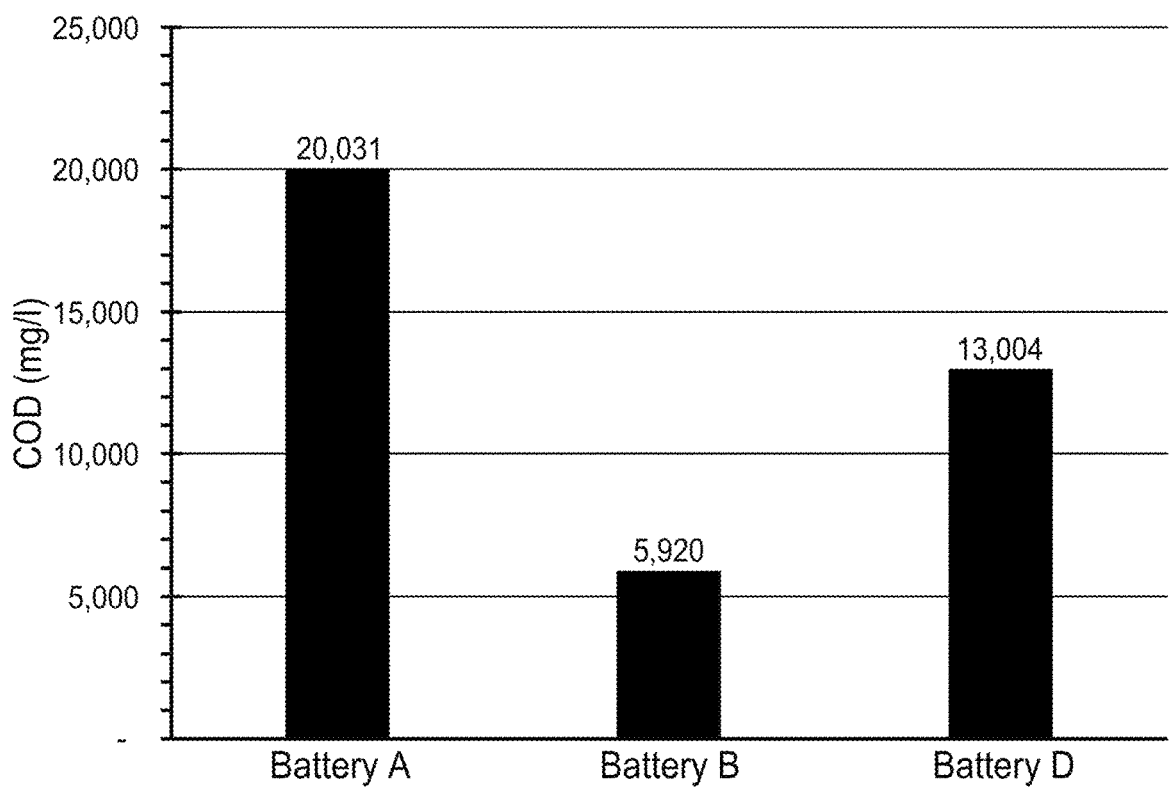
FIG. 5 is a chart showing the chemical oxidation demand (COD) in three of the test battery samples at the end of 84 days on test.

Turning now to FIGS. 4 and 5, the total organic compounds (TOC) and the chemical oxidation demand (COD) were measured for Battery A, Battery B, and Battery D. It is appreciated that the lower these values are, the better the battery will perform. As shown, Battery B, batteries with separators with a first surfactant, performed better than the batteries with no surfactant or the other surfactant.

Besides lowering water loss and leading to extended battery life, preferred separators are also designed to bring other benefits. With regard to assembly, the separators have the negative cross rib design to maximize bending stiffness and ensure highest manufacturing productivity. To prevent shorts during high speed assembly and later in life, the separators have superior puncture and oxidation resistance when compared to standard PE separators.

In accordance with at least certain embodiments, aspects or objects, the present disclosure or invention is directed to or provides novel or improved separators, particularly separators for lead acid batteries; novel or improved separators, battery separators, batteries, cells, systems, vehicles, and/or methods of manufacture and/or use of such separators, battery separators, cells, systems, and/or batteries; an improved separator for lead acid batteries and/or improved methods of using such batteries having such improved separators; methods, systems, treatments, and battery separators for enhancing battery life, reducing battery failure, reducing water loss, lowering float current, minimizing internal resistance increases, increasing wettability, reducing acid stratification, improving acid diffusion, and/or improving uniformity in lead acid batteries; an improved separator for lead acid batteries wherein the separator includes improved functional coatings, improved battery separators which reduce water loss in lead acid batteries, improved lead acid batteries including such improved separators, long life automotive lead acid batteries, hybrid alloy type automotive batteries, hybrid alloy flat plate inverter batteries, improved flooded lead acid batteries, and/or the like, dry charged batteries, and/or batteries having reduced floating charges and/or reduced electrolysis and/or reduced rates of water loss, and/or the like.

Disclosed herein are novel or improved separators, battery separators, lead acid battery separators, batteries, cells, and/or methods of manufacture and/or use of such separators, battery separators, lead acid battery separators, cells, and/or batteries. In accordance with at least certain embodiments, the present disclosure or invention is directed to novel or improved battery separators for lead acid batteries. In addition, disclosed herein are methods, systems and battery separators for enhancing battery life, reducing water loss, reducing float current, minimizing internal resistance increase, reducing failure rate, reducing acid stratification and/or improving uniformity in at least lead acid batteries. In accordance with at least particular embodiments, the present disclosure or invention is directed to an improved separator for lead acid batteries wherein the separator includes improved coatings, improved configurations, and/or the like.

The present invention may be embodied in other forms without departing from the spirit and the essential attributes thereof, and, accordingly, reference should be made to the appended claims, rather than to the foregoing specification, as indicating the scope of the invention.

Additionally, the invention illustratively disclosed herein suitably may be practiced in the absence of any element which is not specifically disclosed herein.

The present invention may be embodied in other forms without departing from the spirit and the essential attributes thereof, and, accordingly, reference should be made to the appended claims, rather than to the foregoing specification, as indicating the scope of the invention.

The foregoing written description of structures and methods has been presented for purposes of illustration only. Examples are used to disclose exemplary embodiments, including the best mode, and also to enable any person skilled in the art to practice the invention, including making and using any devices or systems and performing any incorporated methods. These examples are not intended to be exhaustive or to limit the invention to the precise steps and/or forms disclosed, and many modifications and variations are possible in light of the above teaching. Features described herein may be combined in any combination. Steps of a method described herein may be performed in any sequence that is physically possible. The patentable scope of the invention is defined by the appended claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The compositions and methods of the appended claims are not limited in scope by the specific compositions and methods described herein, which are intended as illustrations of a few aspects of the claims. Any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

As used in the specification and the appended claims, the singular forms "a," "an," and "the" include plural referents unless the context clearly dictates otherwise. Ranges may be expressed herein as from "about" or "approximately" one particular value, and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. "Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers, or steps. The terms "consisting essentially of" and "consisting of" can be used in place of "comprising" and "including" to provide for more specific embodiments of the invention and are also disclosed. "Exemplary" means "an example of" and is not intended to convey an indication of a preferred or ideal embodiment. Similarly, "such as" is not used in a restrictive sense, but for explanatory or exemplary purposes.

Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

Unless defined otherwise, all technical and scientific terms used herein have the same meanings as commonly understood by one of skill in the art to which the disclosed invention belongs. Publications cited herein and the materials for which they are cited are specifically incorporated by reference.

Additionally, the invention illustratively disclosed herein suitably may be practiced in the absence of any element which is not specifically disclosed herein.

The invention claimed is:

1. An improved battery separator for reducing floating charges, reducing water electrolysis, and/or reducing rates of water loss in lead acid batteries comprising:
   a polyolefin porous membrane; and
   at least one additive at a density of at least 5.0 g/m$^2$, and wherein the at least one additive is at least one surfactant and a sulfo-succinate; and
   a ZnSO$_4$ coating on a surfactant coating at a coating density of 3.0 g/m$^2$, and
   wherein the ZnSO$_4$ coating on the surfactant coating is on a side of the polyolefin porous membrane facing a negative electrode, a side of the polyolefin porous membrane facing a positive electrode, or on both sides of the polyolefin porous membrane
   wherein the additive and ZnSO$_4$ coating form a homogenous layer.

2. The separator according to claim 1, wherein the polyolefin porous membrane is at least one of a porous, microporous, mesoporous, or macroporous membrane.

3. The separator according to claim 1, wherein the polyolefin porous membrane comprises polyethylene or comprises ultrahigh molecular weight polyethylene.

4. The separator according to claim 1, wherein the at least one surfactant comprises a non-ionic surfactant.

5. The separator according to claim 1, wherein said polyolefin porous membrane has a backweb and ribs on at least one side thereof.

6. The separator according to claim 1, further comprising a fibrous layer that is present on at least one side of the polyolefin porous membrane.

7. The separator according to claim 6, wherein the fibrous layer comprises glass fibers.

8. The separator according to claims 6, wherein the fibrous layer is present on both sides of the polyolefin porous membrane.

9. The separator according to claim 6, wherein the fibrous layer is from 0.3-1.25 mm thick.

10. A method of reducing failure in a lead acid battery, wherein the method comprises providing a separator according to any of claim 1.

* * * * *